United States Patent [19]

Dick et al.

[11] Patent Number: 5,624,087
[45] Date of Patent: Apr. 29, 1997

[54] SEAT BELT RETRACTOR WITH CINCH MECHANISM

[75] Inventors: Joseph G. Dick, Macomb; Lloyd M. Snyder, Sterling Heights, both of Mich.

[73] Assignee: TRW Vehicle Safety Systems Inc., Lyndhurst, Ohio

[21] Appl. No.: 522,864

[22] Filed: Sep. 1, 1995

[51] Int. Cl.$^6$ .......................... B60R 22/415; B60R 22/42
[52] U.S. Cl. ................... 242/381.1; 242/382.2; 242/376.1; 242/382.6; 242/384.2
[58] Field of Search .................... 242/382.2, 381.1, 242/376.1, 382.6, 384.2; 280/806; 297/478, 480

[56] References Cited

U.S. PATENT DOCUMENTS

| | | | |
|---|---|---|---|
| 4,506,844 | 3/1985 | Ernst | 242/376.1 |
| 4,597,546 | 7/1986 | Yamamoto et al. | |
| 4,747,562 | 5/1988 | Tsukamoto et al. | |
| 4,749,142 | 6/1988 | Saitow | |
| 4,749,143 | 6/1988 | Tsukamoto et al. | |
| 4,811,912 | 3/1989 | Takada | 242/382.2 |
| 4,948,066 | 8/1990 | Matsumoto et al. | 242/382.2 |
| 5,257,754 | 11/1993 | Hishon | 242/382.2 |
| 5,323,977 | 6/1994 | Frei et al. | 242/381.1 |
| 5,511,741 | 4/1996 | Zolkower et al. | 242/381.1 |

*Primary Examiner*—John M. Jillions
*Attorney, Agent, or Firm*—Tarolli, Sundheim, Covell, Tummino & Szabo

[57] ABSTRACT

A vehicle seat belt retractor (10) includes a rotatable spool (170) on which seat belt webbing (16) is wound. An actuator (230) is selectively rotatable with the spool (170) to actuate a primary belt locking mechanism (270) to block withdrawal of belt webbing (16) from the retractor (10) in a vehicle emergency situation. A cinch mechanism (400) is actuatable in response to withdrawal of a predetermined amount of belt webbing (16) from the spool (170). The cinch mechanism (400) is supported on the actuator (230) for rotation with the actuator.

15 Claims, 6 Drawing Sheets

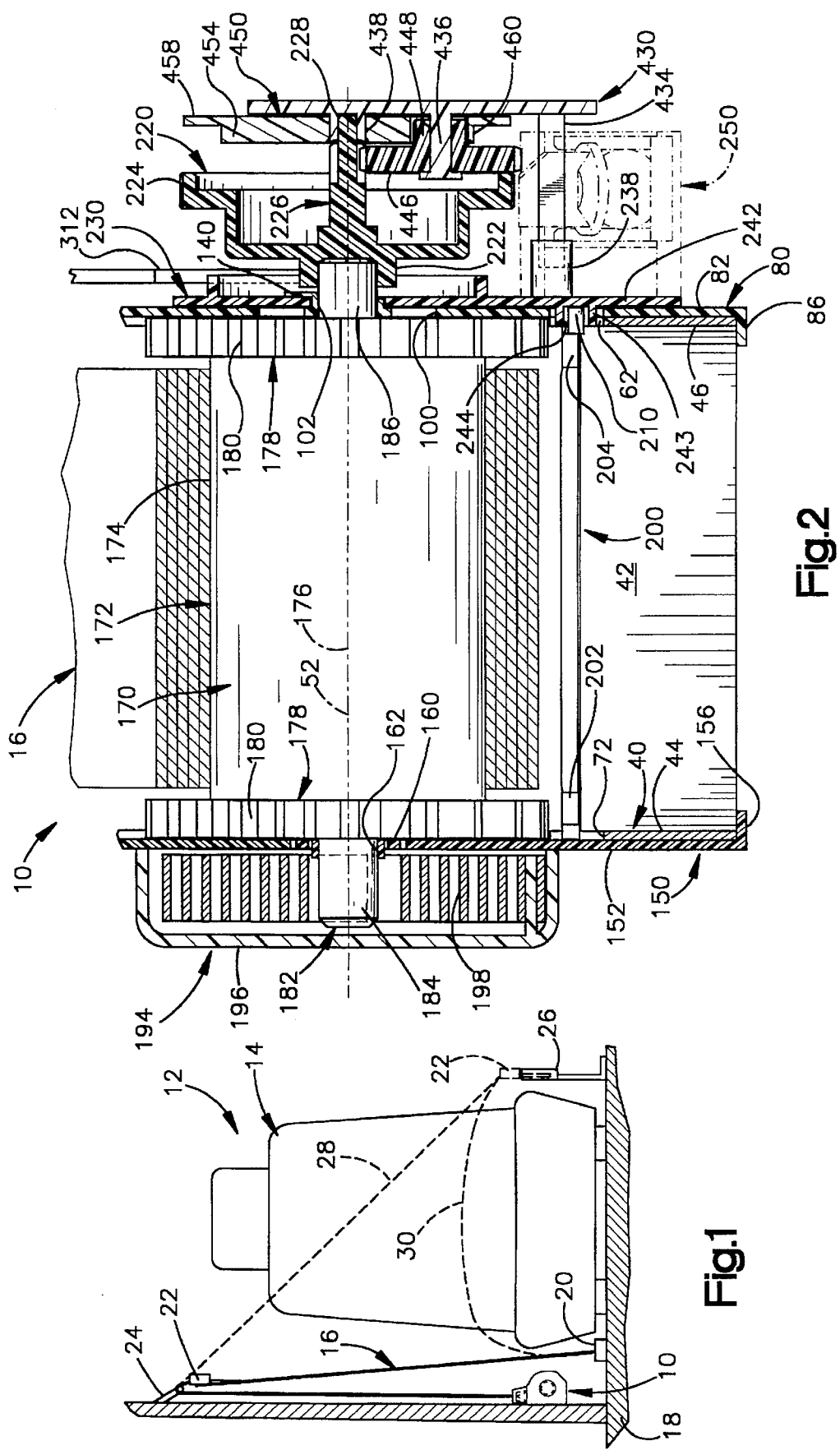

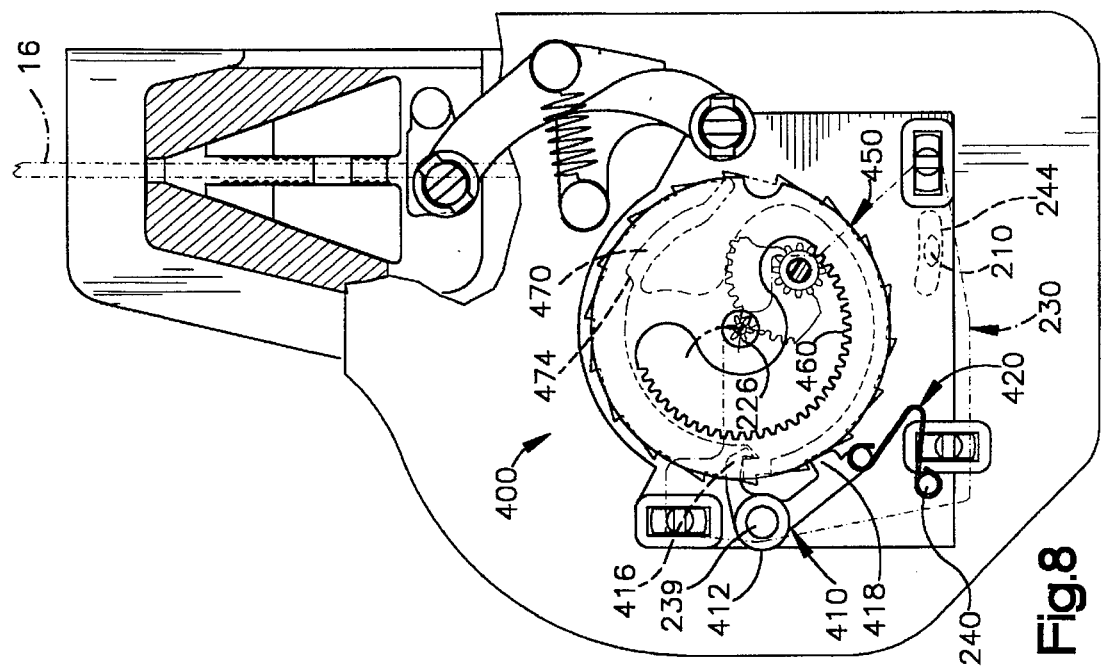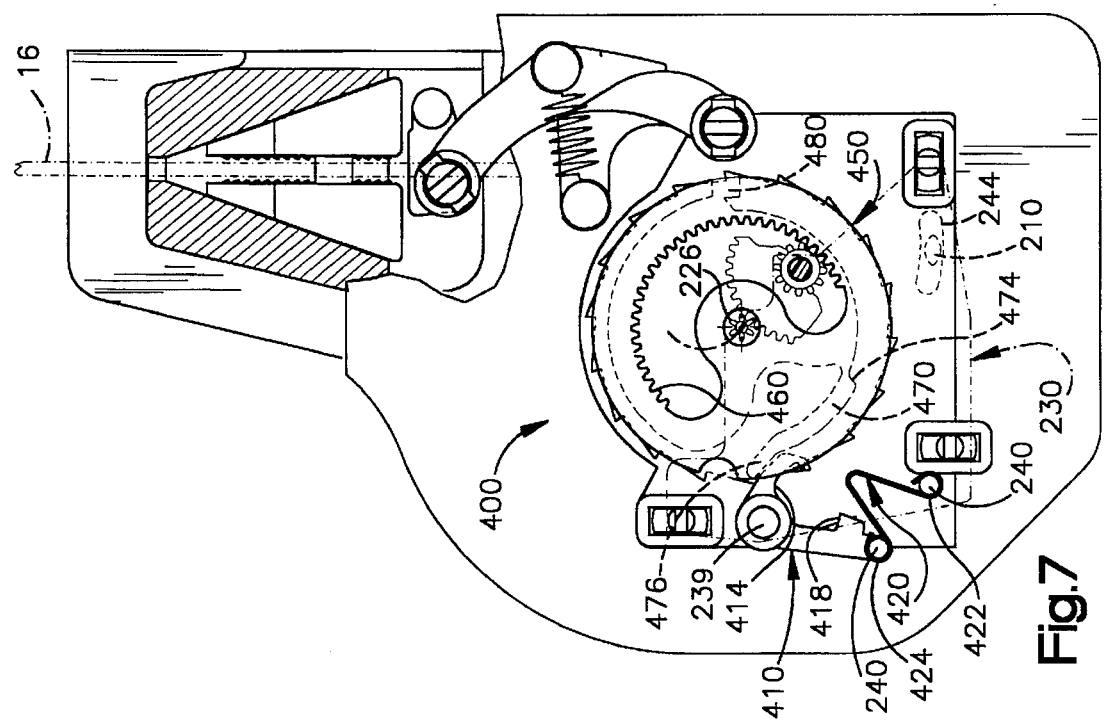

SEAT BELT RETRACTOR WITH CINCH MECHANISM

BACKGROUND OF THE INVENTION

1. Technical Field

The present invention relates to a vehicle seat belt webbing retractor, and, in particular, to a retractor including a cinch mechanism for blocking withdrawal of belt webbing from a spool in response to rotation of the spool in a predetermined manner.

2. Description of the Prior Art

A typical seat belt system to restrain a vehicle occupant includes a length of belt webbing wound on a spool of a seat belt webbing retractor. The belt webbing is extensible about a vehicle occupant to restrain the occupant. Some known seat belt webbing retractors include a cinch mechanism for blocking rotation of the spool in a belt withdrawal direction in response to rotation of the spool of the retractor in a predetermined manner.

SUMMARY OF THE INVENTION

The present invention is a seat belt retractor comprising a length of seat belt webbing which is extensible about a vehicle occupant to restrain the vehicle occupant. A spool on which the belt webbing is wound is rotatable about an axis in a belt retraction direction and in an opposite belt withdrawal direction. An actuator is supported for movement on the retractor. The actuator is movable with the spool from a first position to a second position in response to the sensing means sensing a vehicle emergency situation. A primary belt locking mechanism is actuatable in response to movement of the actuator from the first position to the second position to block withdrawal of belt webbing from the retractor. The retractor includes a locking mechanism for actuating the primary belt locking mechanism to block withdrawal of belt webbing from the retractor in response to withdrawal of a predetermined amount of seat belt webbing from the spool. The locking mechanism is supported on the actuator for movement with the actuator.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat belt system including a seat belt webbing retractor in accordance with the present invention;

FIG. 2 is a longitudinal view partially in section of portions of the retractor of FIG. 1;

FIG. 7 is a view similar to FIG. 6 showing other parts of the retractor of FIG. 1 including a cinch mechanism in an unactuated condition; and FIG. 8 is a view similar to FIG. 7 showing the cinch mechanism in an actuated condition.

DESCRIPTION OF PREFERRED EMBODIMENT

Figure 3:
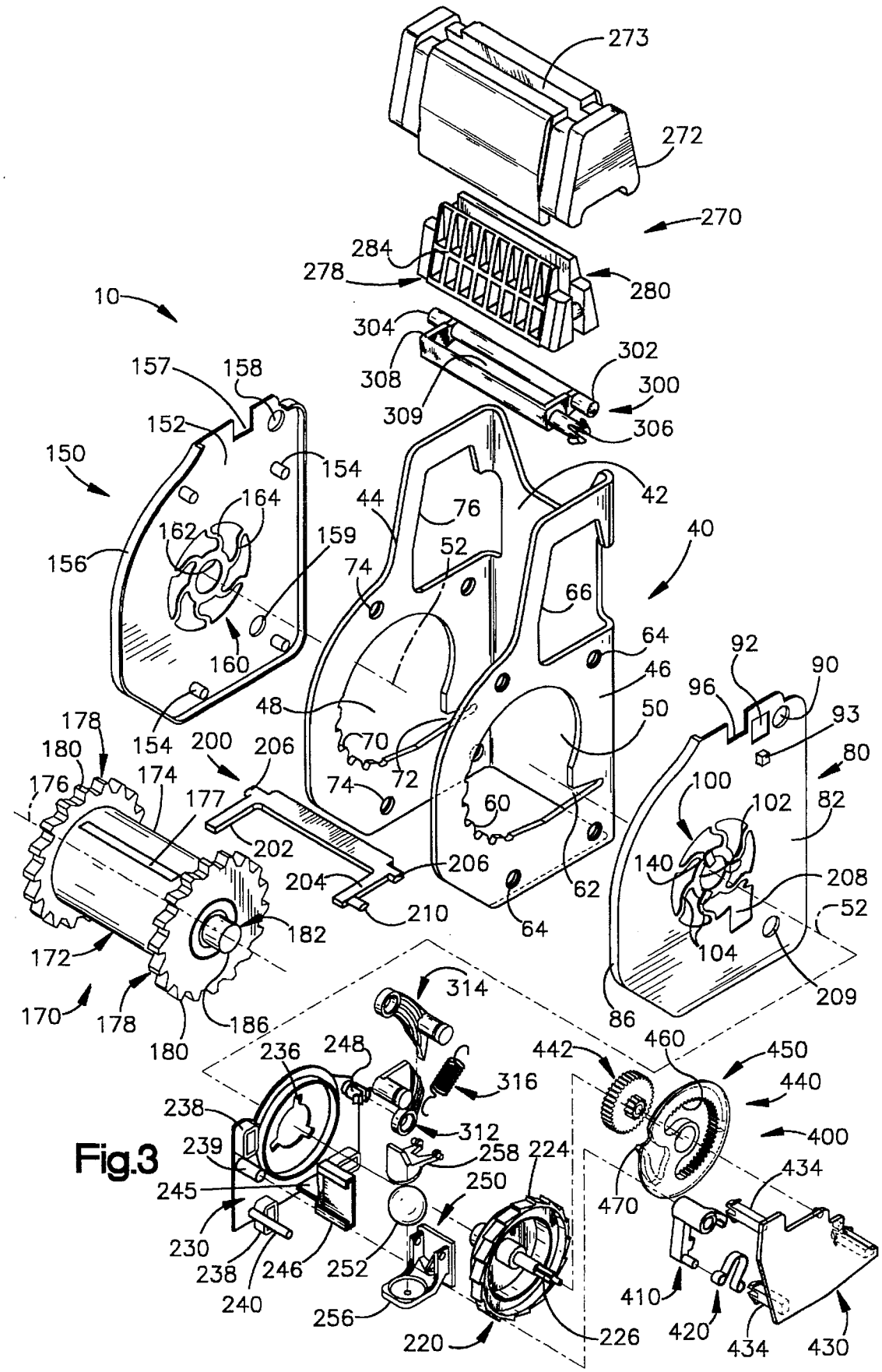
FIG. 3 is an exploded perspective view of the retractor of FIG. 1.

The present invention relates to a vehicle seat belt webbing retractor, and, in particular, to a retractor including a cinch mechanism for blocking withdrawal of belt webbing in response to rotation of a spool of the retractor in a predetermined manner. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body 18 on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The retractor 10 (FIGS. 2 and 3) includes a frame 40 which is fixed to the vehicle body 18 in a manner not shown. The frame 40 is a single piece of sheet metal stamped and formed to a U-shaped configuration as best seen in FIG. 3. The frame 40 includes a back wall 42 and spaced parallel side walls 44 and 46 which extend generally perpendicular to the back wall.

A generally circular opening 48 is formed in one frame side wall 44. A generally circular opening 50, identical to the opening 48, is formed in the opposite frame side wall 46. The openings 48 and 50 are centered on a primary axis 52 of the retractor 10. The primary axis 52 extends between the frame side walls 44 and 46 in a direction parallel to the frame back wall 42.

A series of fixed teeth 60 are formed on one sector of the outer periphery of the opening 50 in the frame side wall 46. The fixed teeth 60 are disposed at a location generally below the primary axis 52 and on the opposite side of the primary axis from the back wall 42 of the frame 40. A wedge-shaped lock pawl opening 62 is formed on the outer periphery of the circular opening 50 in the frame side wall 46. The lock pawl opening 62 is disposed at a location generally below the primary axis 52 and on the same side of the primary axis as the back wall 42 of the frame 40. Four sensor plate support openings 64 are formed in the one frame side wall 46. The upper portion of the side wall 46 also includes an opening 66 for receiving parts of a belt webbing clamp mechanism 270 described below.

The frame side wall 44 is a mirror image of the frame side wall 46. The frame side wall 44 includes a series of fixed teeth 70 on the outer periphery of the opening 48. The frame side wall 44 also includes a wedge-shaped lock pawl opening 72 on the outer periphery of the opening 48. Four spring plate support openings 74 are formed in the frame side wall 44. The upper portion of the side wall 44 includes a belt webbing clamp mechanism opening 76.

A sensor plate 80 (FIGS. 2 and 3) is fixed to the frame side wall 46. The sensor plate 80 is a one-piece plastic molding and includes a planar main wall portion 82 disposed in abutting engagement with the frame side wall 46. Four support pins (not shown) extend from the main wall portion 82 into the support pin openings 64 in the frame side wall 46. The support pins secure the sensor plate 80 in position on the side wall 46 of the frame 40. An outer peripheral rim 86 of the sensor plate 80 projects axially from the main wall portion 82 in a direction toward the opposite side wall 44 of the frame 40. The rim 86 wraps around the lower portion of the side wall 46 of the frame 40.

The sensor plate 80 includes an initiator pivot pin opening 90 and an initiator link post opening 92 which overlie the clamp mechanism opening 66 in the frame side wall 46. An upper link arm stopper 93 is disposed below the initiator link post opening 92 and projects axially in a direction away from the frame side wall 46. A clamp housing support notch 96 is formed in the upper edge of the sensor plate 80. A lock pawl opening 208 and a lock pawl pivot opening 209 are disposed near the bottom of the sensor plate 80 and overlie the lock pawl opening 62 in the frame side wall 46.

The sensor plate 80 includes a bearing section 100 which includes a cylindrical hub 102. The hub 102 is normally centered on the primary axis 52 of the retractor 10. A circular array of support arms 104 connects the hub 102 with the main wall portion 82 of the sensor plate 80. The support arms 104 are flexible and support the hub 102 for limited movement relative to the main wall portion 82 and the primary axis 52. The sensor plate 80 further includes three assembly tabs 140 (FIGS. 2 and 3) which project radially outward from the hub 102. The assembly tabs 140 are spaced apart from and extend parallel to the main wall portion 82 of the sensor plate 80, as can be seen in FIG. 2.

The retractor 10 includes a spring plate 150 (FIGS. 2 and 3) which is substantially similar to the sensor plate 80. The spring plate 150 is a one-piece plastic molding which includes a planar main wall portion 152 disposed in abutting engagement with the frame side wall 44. Four support pins 154 on the main wall portion 152 of the spring plate 150 extend into the openings 74 in the frame side wall 44 to secure the spring plate on the frame side wall.

An outer peripheral rim 156 of the spring plate 150 projects axially from the main wall portion 152 in a direction toward the opposite side wall 46 of the frame 40. A clamp housing support notch 157 is formed in the upper edge of the spring plate 150. A circular initiator pivot pin opening 158 overlies the clamp mechanism opening 76 in the frame side wall 44. A lock pawl pivot opening 159 near the bottom of the spring plate 150 overlies the lock pawl opening 72 in the frame side wall 44.

The spring plate 150 includes a bearing section 160 which is similar to the bearing section 100 of the sensor plate 80. The bearing section 160 includes a cylindrical hub 162 which is normally centered on the primary axis 52 of the retractor 10. The hub 162 is supported by a circular array of flexible support arms 164 for limited movement relative to the primary axis 52 and the main wall portion 152.

The retractor 10 includes a spool 170 (FIGS. 2 and 3). The spool 170, as illustrated, is a multi-piece structure including a reel 172 on which the belt webbing 16 is wound, a pair of spool locking ratchet wheels 178, and a shaft 182. It should be understood that spools having other configurations could be used, such as a spool which is formed as one piece.

The reel 172 has a cylindrical outer surface 174 centered on a spool axis 176. An end portion of the belt webbing 16 extends through a webbing slot 177 in the reel 172 and is secured to the reel in a known manner (not shown). The spool axis 176 is normally coincident with the primary axis 52 of the retractor 10. The spool axis 176 is movable relative to the primary axis 52, together with the hubs 102 and 162, in a manner described below. The spool locking ratchet wheels 178 are disposed at opposite ends of the reel 172 and are fixed for rotation with the reel. A plurality of ratchet teeth 180 are disposed in a circular array on the outer periphery of each spool locking ratchet wheel 178.

The cylindrical metal shaft 182 (FIGS. 2 and 3) is fixed for rotation with the reel 172. A first end portion 184 (FIG. 2) of the shaft 182 projects axially from the left end (as viewed in FIG. 2) of the reel 172. The first end portion 184 of the shaft 182 is journalled for rotation in the hub 162 of the spring plate 150. A second end portion 186 (FIGS. 2 and 3) of the shaft 182 projects axially from the right end (as viewed in FIG. 2) of the reel 172. The second end portion 186 of the shaft 182 is journalled for rotation in the hub 102 of the sensor plate 80. The spool 170 is thereby supported for rotation about the primary axis 52, relative to the frame 40, in a belt retraction direction 190 (FIG. 5) and in an opposite belt withdrawal direction 192.

A rewind spring mechanism indicated schematically at 194 (FIG. 2) is disposed on the side of the frame side wall 44 opposite the reel 172. The rewind spring mechanism 194 includes a cover 196 which is connected with the frame 40 in a manner not shown. A spring 198 is connected between the cover 196 and the first end portion 184 of the shaft 182. The spring 198 biases the spool 170 for rotation in the belt retraction direction 190. It should be understood that other types of rewind mechanisms could be used, such as one including a separate spring driver element fixed on the end portion 184 of the spool shaft 182.

A lock pawl 200 (FIG. 3) is disposed adjacent to the spool locking ratchet wheels 178. The lock pawl 200 is preferably made from metal and includes at its opposite ends a pair of locking arms 202 and 204. The lock pawl 200 extends through the lock pawl openings 72 and 62 in the frame 40. At opposite ends of the lock pawl 200, a pair of pivot arms 206 are received in the lock pawl pivot openings 209 and 159 in the sensor plate 80 and the spring plate 150, respectively. The lock pawl 200 is thereby supported for pivotal movement relative to the frame 40. A cam tab 210 of the lock pawl 200 extends axially outward from the one locking arm 204 through the lock pawl opening 208 in the sensor plate 80 in a direction away from the frame 40.

A clutch support or pilot ratchet 220 is fixed for rotation with the spool 170. The pilot ratchet 220 includes a hub portion 222 (FIG. 2) secured to the second end portion 186 of the shaft 182 in a manner not shown, such as by a key and slot assembly, to fix the pilot ratchet for rotation with the spool 170 in a predetermined angular orientation relative to the spool. A plurality of pilot ratchet teeth 224 are disposed in a circular array on the outer periphery of the pilot ratchet 220. A pinion gear 226, coaxial with the end portion 186 of the shaft 180, is formed as one piece with the pilot ratchet 220. The pilot ratchet 220 has an axially projecting outer end portion 228.

An actuator 230 is supported on the hub 102 of the sensor plate 80 for limited rotation relative to the frame 40 about the primary axis 52. A return spring (not shown) acting between the actuator 230 and the sensor plate 80 biases the actuator against rotation in the belt withdrawal direction 192. The actuator 230 has a radially extending disk portion 232 which defines a circular central opening 234 of the actuator. Three assembly slots 236 extend radially outward from the central opening 234. The assembly tabs 140 on the sensor plate 80 are, during assembly of the retractor 10, inserted through the assembly slots 236 in the actuator 230. The actuator 230 is then rotated in the direction 190 (FIG. 5) relative to the sensor plate 80 to the position shown in FIG. 5. The assembly tabs 140 hold the actuator 230 in position against the sensor plate 80.

Three snap receptors 238 are formed on the actuator 230. The snap receptors 238 project axially from the actuator 230 in a direction away from the frame 40 (to the right as viewed in FIG. 2.) A cylindrical cinch pawl support post 239 and a cylindrical spring support post 240 also project axially from the actuator 230 in a direction away from the frame 40 (to the right as viewed in FIG. 2. The cinch pawl support post 239 and the spring support post 240 are fixed for rotation with the actuator 230, relative to the frame 40, about the primary axis 52.

The actuator 230 has a cam portion 242 (FIG. 4) that extends radially outward from the disk portion 232. A cam support 243 (FIG. 2) extends axially from the cam portion 242 of the actuator 230 in a direction toward the frame 40. A cam slot 244 (FIGS. 2, 5–6) is formed in the cam support 243 and receives the cam tab 210 of the lock pawl 200.

A sensor reinforcement tab 245 and a sensor receptor 246 project axially from a lower portion of the actuator 230 in a direction away from the frame 40. The actuator 230 also includes a lower link arm pivot post 248 which projects axially from an upper portion of the actuator in a direction away from the frame 40. The sensor receptor 246, the lower link arm pivot post 248, and the cam support 243 are fixed for rotation with the actuator 230, relative to the frame 40, about the primary axis 52.

The retractor 10 includes a vehicle deceleration sensing assembly 250 (FIGS. 3–6) for sensing sudden vehicle deceleration such as occurs in a vehicle collision. The vehicle deceleration sensing assembly 250 includes an inertia mass 252, which is preferably a steel ball. The inertia mass 252 rests in a cavity 254 in a sensor housing 256. The sensor housing 256 is supported on the sensor receptor 246 of the actuator 230.

A sensor lever 258 is supported by a pair of axially extending pivot pins on the sensor housing 256 for pivotal movement relative to the sensor housing. The sensor lever 258 rests upon the inertia mass 252 and has a tooth 260 which extends upward and radially in a direction toward the pilot ratchet teeth 224 on the pilot ratchet 220. The tooth 260 on the sensor lever 258 is disposed axially coincident with (i.e., lies in the same plane as) the pilot ratchet teeth 224 on the pilot ratchet 220. The sensor lever 258 normally is disposed, under the influence of gravity, in a position in which the tooth 260 is spaced downward from and radially outward from the pilot ratchet teeth 224 on the pilot ratchet 220.

Figure 5:
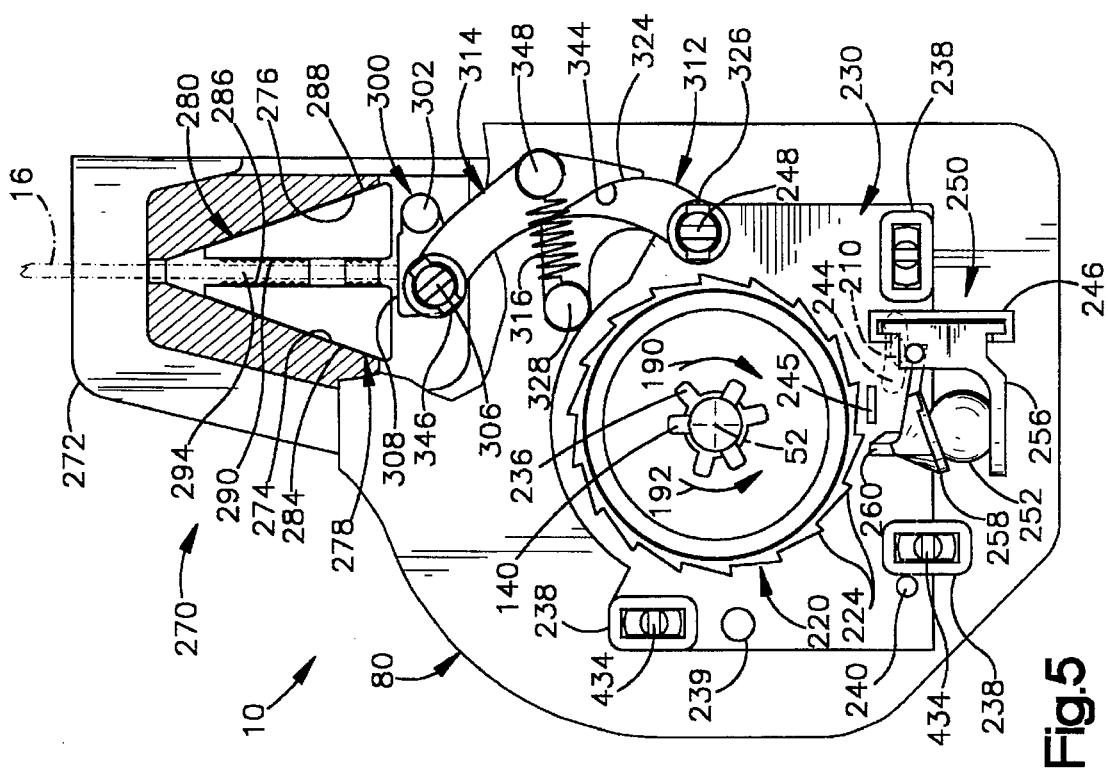
FIG. 5 is a schematic end view of parts of the retractor of FIG. 1 including a vehicle deceleration sensing mechanism and a primary belt locking mechanism shown in an unactuated condition.

The retractor 10 includes a primary belt locking mechanism which, in the preferred embodiment, is a belt webbing clamp assembly 270. The clamp assembly 270 includes a clamp housing 272 which extends through the clamp mechanism openings 66 and 76 of the frame 40 and which is received and supported in the support notches 96 and 157 in the sensor plate 80 and the spring plate 150, respectively. The belt webbing 16 extends through a webbing slot 273 in the clamp housing 272. The clamp housing 272 has a planar first sliding surface 274 (FIG. 5). A planar second sliding surface 276 is presented toward, but at an angle to, the first sliding surface 274.

A pair of clamp members 278 and 280 are supported in a known manner between the sliding surfaces 274 and 276 for sliding movement relative to the clamp housing 272. The first clamp member 278 is generally wedge-shaped in cross-sectional configuration. The first clamp member 278 has a planar sliding surface 284 in abutting engagement with the first sliding surface 274 on the clamp housing 272. The first clamp member 278 also has a planar clamping surface 286 with a plurality of teeth. The clamping surface 286 is inclined relative to the sliding surface 284.

The second clamp member 280 is similar in configuration to the first clamp member 278. The second clamp member 280 has a planar sliding surface 288 in abutting engagement with the second sliding surface 276 on the clamp housing 272. The second clamp member 280 has a planar clamping surface 290 presented toward the clamping surface 286 of the first clamp member 278. The clamping surface 290 is inclined to the sliding surface 288. A plurality of teeth are formed on the clamping surface 290 of the second clamp member 280. The clamp members 278 and 280, and particularly the clamping surfaces 286 and 290, define between them a belt webbing passage 294 through which the belt webbing 16 is movable when the spool 170 rotates in the belt retraction direction 190 and the belt withdrawal direction 192.

The clamp members 278 and 280 are connected in a known manner for providing simultaneous sliding movement of the clamp members relative to the clamp housing 272. Thus, the clamp members 278 and 280 move in a direction toward or away from each other while they simultaneously slide (upward or downward as viewed in FIG. 5) relative to the clamp housing 272. A return spring (not shown) biases the clamp members 278 and 280 outwardly away from each other and downward as viewed in FIG. 5, into an unactuated or released position shown in FIG. 5.

The clamp assembly 270 (FIG. 3) also includes an initiator 300 for effecting movement of the clamp members 278 and 280. At one end of the initiator 300, a cylindrical pivot pin 302 extends through the opening 66 in the frame 40 and through the opening 90 in the sensor plate 80. A pivot pin 304 at the opposite end of the initiator 300 extends through the opening 76 in the frame 40 and through the opening 158 in the spring plate 150. The pivot pins 302 and 304 support the initiator 300 for pivotal movement relative to the frame 40.

Figure 6:
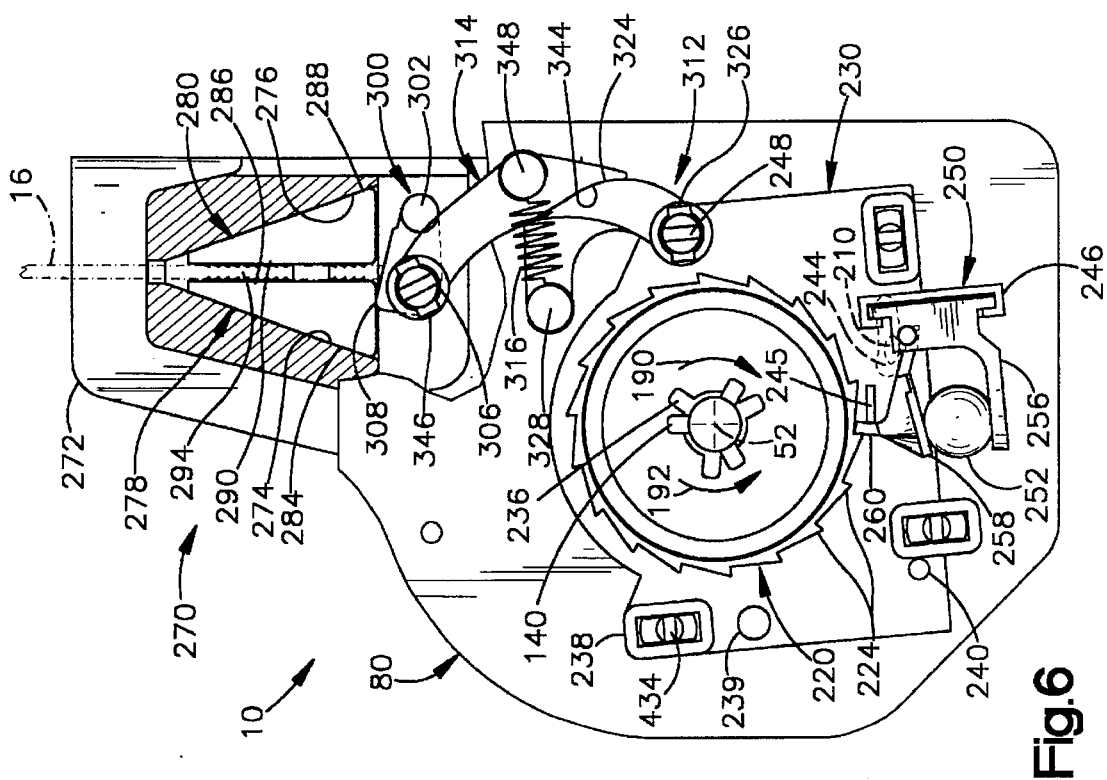
FIG. 6 is a view similar to FIG. 5 showing the vehicle deceleration sensing mechanism and the primary belt locking mechanism in an actuated condition.

The initiator 300 includes a link post 306 which extends through the opening 66 in the side wall 46 of the frame 40 and through the opening 92 in the sensor plate 80. An upwardly presented engagement surface 308 (FIG. 5) on the initiator 300 adjoins the first clamp member 278. The engagement surface 308 is engageable with the first clamp member 278, in a manner described below, to move the first clamp member, and thereby the second clamp member 280, to an actuated or engaged condition as shown in FIG. 6. The initiator 300 also has a webbing slot 309, adjacent to the engagement surface 308, through which the belt webbing 16 extends between the spool 170, the belt webbing passage 294, and the webbing slot 273 in the clamp housing 272.

A link assembly 310 (FIG. 4) interconnects the actuator 230 and the clamp mechanism 270. The link assembly 310 includes a lower link arm 312, an upper link arm 314, and a link assembly spring 316.

The lower link arm 312 (FIG. 4) has a main body portion 320. An arcuate engagement surface 324 on the main body portion 320 of the lower link arm 312 is presented toward the upper link arm 314. A hub 326 at the lower end of the lower link arm 312 is snapped on the lower link arm pivot post 248 (FIGS. 4 and 5) of the actuator 230. The lower link arm 312 is thus supported for pivotal movement relative to the actuator 230. A spring support post 328 is formed on a planar extension 330 of the lower link arm 312. The spring support post 328 projects axially from the lower link arm 312 in a direction away from the frame 40. A spring retainer rib 332 is formed on the spring support post 328.

The upper link arm 314 is similar in configuration to the lower link arm 312 and includes an arcuate main body portion 340. An arcuate engagement surface 344 on the main body portion 340 of the upper link arm 314 is presented toward the lower link arm 312. The engagement surface 344 on the upper link arm 314 is in abutting engagement with the engagement surface 324 on the lower link arm 312 as shown in FIG. 5.

A hub 346 at the upper end of the upper link arm 314 is snapped on the link post 306 (FIG. 5) of the initiator 300. The upper link arm 314 is thereby supported for pivotal movement relative to the initiator 300. The upper link arm 314 further includes a spring support post 348 (FIG. 4) which projects axially in a direction away from the frame 40. A spring retainer rib 350 is formed on the spring support post 348.

The link assembly spring 316 is a tension spring having a first end portion 354 received on the spring support post 348 of the upper link arm 314 between the spring retainer rib 350 and the main body portion 340 of the upper link arm. A second end portion 356 of the link assembly spring 316 is received on the spring support post 328 of the lower link arm 312 between the spring retainer rib 332 and the main body portion 320 of the lower link arm. The link assembly spring 316 biases the upper link arm 314 and the lower link arm 312 toward each other, into a position as shown in FIG. 5.

Figure 4:
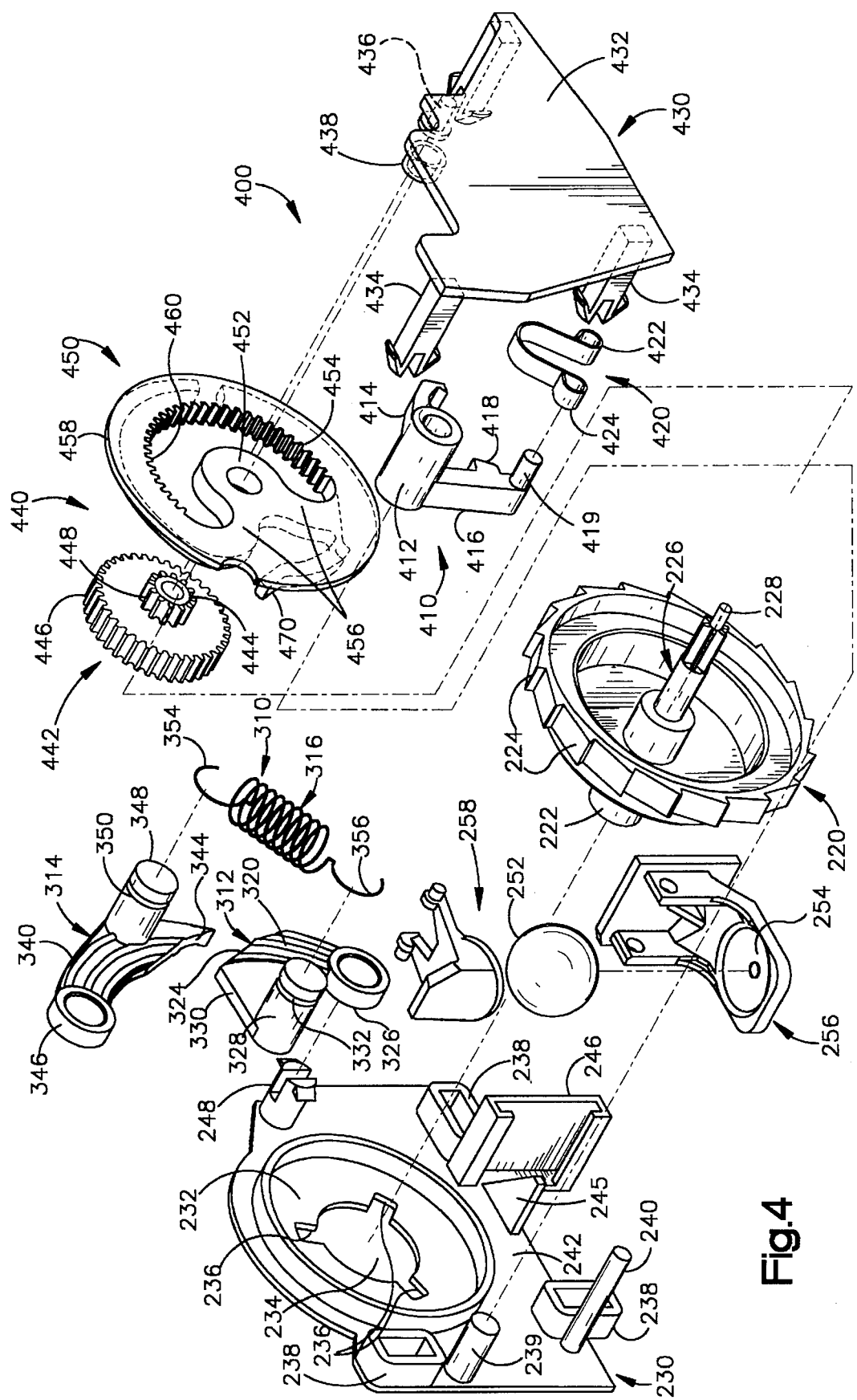
FIG. 4 is an enlarged view of a portion of FIG. 3.

The retractor 10 includes an automatic locking mechanism or cinch mechanism 400 for selectively coupling the actuator 230 for rotation with the pilot ratchet 220 in response to rotation of the spool 170 in a predetermined manner. The cinch mechanism 400 includes a cinch pawl 410 (FIGS. 2–4). The cinch pawl 410 has a hub 412 (FIG. 4) which is supported for pivotal movement on the cinch pawl support post 239 on the actuator 230. The cinch pawl 410 is thus supported on the actuator 230 for rotation with the actuator about the primary axis 52.

The cinch pawl 410 (not shown in FIGS. 5 and 6 for clarity) has a generally L-shaped configuration as viewed in FIG. 7. A cam follower arm 414 projects radially from the hub 412 in a direction generally toward the primary axis 52. The L-shaped configuration of the cinch pawl 410 also includes a spring support portion 416 that projects radially from the hub 412 in a generally downward direction. A cinch tooth 418 projects from the spring support portion 416 of the cinch pawl 410 in a direction toward the pilot ratchet teeth 224 on the pilot ratchet 220. A cinch spring pivot post 419 projects from the spring support portion 416 of the cinch pawl 410 in a direction away from the frame 40.

Figure 9:
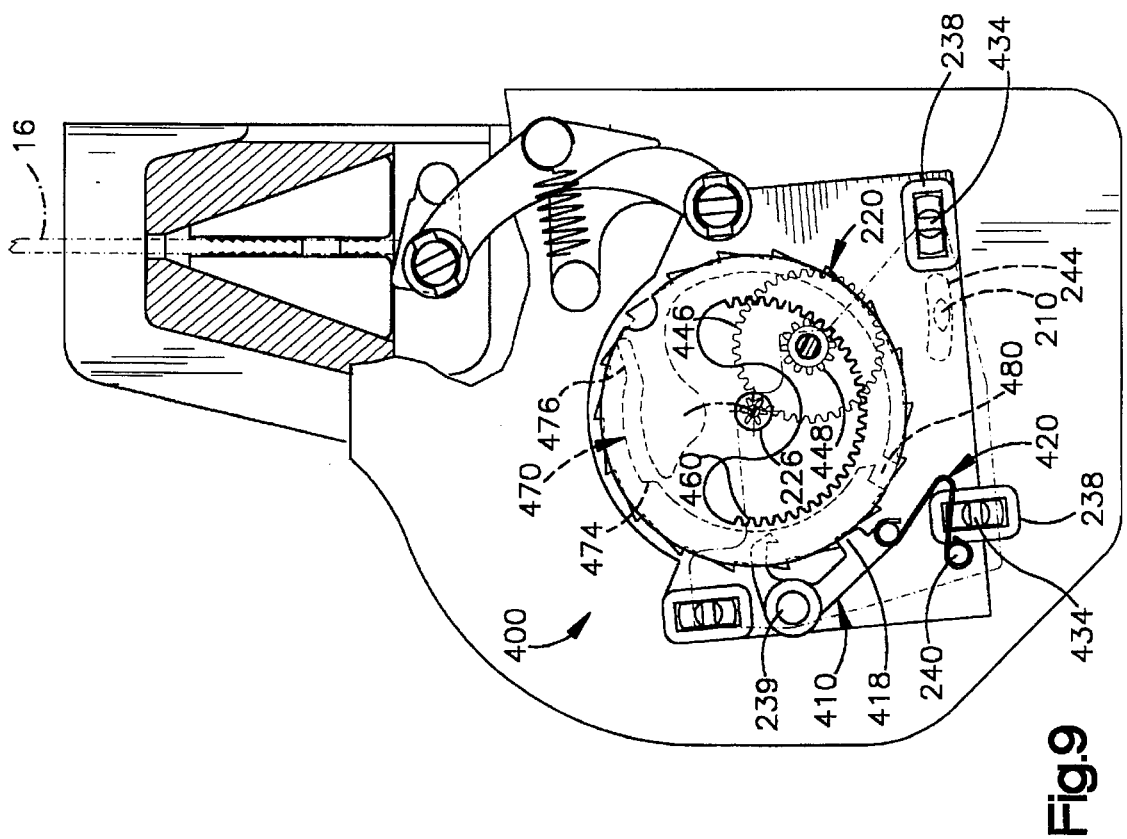
FIG. 9 is a view similar to FIG. 8 showing the cinch mechanism still in the actuated condition and after some rotation of the retractor spool in a belt retraction direction with the primary belt locking mechanism in an actuated condition.

The cinch mechanism 400 includes a cinch spring 420. The cinch spring 420 (not shown in FIGS. 5 and 6) is an overcenter spring having a first end portion 422 (FIG. 7) mounted on the spring support post 240 on the actuator 230. A second end portion 424 of the cinch spring 420 is mounted on the cinch spring pivot post 419 of the cinch pawl 410. The cinch spring 420 is thus supported on the actuator 230 and on the cinch pawl 410 for rotation with the actuator and the cinch pawl about the primary axis 52. When the cinch spring 420 is in a first condition as viewed in FIG. 7, it biases the cinch pawl 410 for pivotal movement about the cinch pawl support post 239 in a counter-clockwise direction as viewed in FIGS. 7–9. When the cinch spring 420 is in a second condition as viewed in FIG. 8, it biases the cinch pawl 410 for pivotal movement about the cinch pawl support post 239 in a clockwise direction as viewed in FIGS. 7–9.

The cinch mechanism 400 also includes a cinch plate 430 (FIG. 4). The cinch plate 430 has a planar main body portion 432 which extends generally perpendicular to the primary axis 52 of the retractor 10. Three snaps 434 are formed on the cinch plate 430. The snaps 434 project axially from the main body portion 432 of the cinch plate 430 in a direction toward the frame 40 (to the left as viewed in FIG. 2). The snaps 434 on the cinch plate 430 are received in the snap receptors 238 on the actuator 230. The cinch plate 430 is thus supported on the actuator 230 for rotation with the actuator about the primary axis 52.

The cinch plate 430 has an intermediate gear support post 436 which projects axially in a direction from the cinch plate 430 toward the frame 40. The cinch plate 430 also has an actuator gear support post 438 which has a tubular cross-sectional configuration. The outer end portion 228 of the pilot ratchet 220 is rotatably received in the center of the support post 438.

The cinch plate 430 supports a reduction gear assembly 440 which forms a part of the cinch mechanism 400. The reduction gear assembly 440 includes an intermediate gear 442. The intermediate gear 442 has a hub 444 which is rotatably supported on the intermediate gear support post 436 on the cinch plate 430. The intermediate gear 442 is thus supported on the cinch plate 430 for movement with the cinch plate and with the actuator 230 when the actuator rotates about the primary axis 52 of the retractor 10.

The intermediate gear 442 includes a circular driver gear 446 which has a larger diameter than the pinion gear 226. The driver gear 446 is in meshing engagement with the pinion gear 226 of the pilot ratchet 220. The intermediate gear 442 also includes a circular follower gear 448 which is formed as one piece with the driver gear 446. The follower gear 448 has a smaller diameter than the driver gear 446.

The cinch mechanism 400 further includes an actuator gear 450 which is a one-piece generally disc-shaped member having a circular configuration centered on the primary axis 52. A hub portion 452 (FIG. 4) of the actuator gear 450 is rotatably supported on the outer periphery of the actuator gear support post 438 on the cinch plate 430. The actuator gear 450 is thus supported on the cinch plate 430 for movement with the cinch plate and with the actuator 230 when the actuator rotates about the primary axis 52 of the retractor 10.

An outer peripheral portion 454 of the actuator gear 450 is supported radially outward of the hub portion 452 by two arcuate support arms 456. The outer peripheral portion 454 of the actuator gear 450 supports a radially outward extending disc portion 458 of the actuator gear 450. A plurality of internal gear teeth forming an arcuate gear segment 460 (FIG. 4) are disposed in a circular array on a radially inner circumference of the outer peripheral portion 454 of the actuator gear 450. The gear segment 460 is in meshing engagement with the follower gear 448 and has a center of curvature coincident with the primary axis 52. In the preferred embodiment, the gear segment 460 has a circumferential extent of about 200° between its opposite end portions.

The actuator gear 450 includes a cam lobe 470 (FIGS. 3 and 4) which projects axially from the disc portion 458. The cam lobe 470 is axially coincident with (i.e., lies in the same plane as) the cam follower arm 414 of the cinch pawl 410. The cam lobe 470 includes a ramp portion 474 (FIG. 7) and an end portion 476. The cam lobe 470 has an outer peripheral cam surface with which the cam follower arm 414 of the cinch pawl 410 is engageable. The actuator gear 450 also includes a pawl engagement tab 480. The pawl engagement tab 480 is spaced apart circumferentially about 180° from the end portion 476 of the cam lobe 470. The pawl engagement tab 480 is axially coincident with (i.e., lies in the same plane as) the cam follower arm 414 of the cinch pawl 410.

FIG. 5 illustrates the position of selected parts of the retractor 10 when the vehicle in which the retractor is mounted is not experiencing deceleration above a predetermined deceleration. The inertia mass 252 rests at the bottom of the cavity 254 in the sensor housing 256. The tooth 260 on the sensor lever 258 is spaced from the pilot ratchet teeth 224 on the pilot ratchet 220. The actuator 230 is in a first position of rotation, about the primary axis 52 of the retractor 10, as shown in FIG. 5. The first and second clamp members 278 and 280 are spaced apart from each other, and the belt webbing 16 is movable through the passage 294 between the first and second clamp members. The lock pawl 200 is in a position spaced apart from the ratchet teeth 180 on the spool 170. The ratchet teeth 180 (seen also in FIG. 7) are spaced apart from and are rotatable relative to the fixed teeth 60 and 70 on the frame side walls 46 and 44, respectively. The hub 102 on the sensor plate 80 and the hub 162 on the spring plate 150 are concentric with the primary axis 52 of the retractor 10. The spool axis 176 is coincident with the primary axis 52 of the retractor 10, and the spool 170 is supported for rotation about the primary axis of the retractor.

In the event of a vehicle emergency situation such as vehicle deceleration above a predetermined deceleration, the inertia mass 252 moves relative to the sensor housing 256. The movement of the inertia mass 252 causes the sensor lever 258 to pivot upward from the position shown in FIG. 5 to the position shown in FIG. 6. The tooth 260 on the sensor lever 258 moves into engagement with the pilot ratchet 220. Rotation of the spool 170 and the pilot ratchet 220 in the belt withdrawal direction 192 causes the next available ratchet tooth 224 on the pilot ratchet to engage the sensor lever 258.

Thereafter, the sensor lever 258 transmits rotational force from the pilot ratchet 220 into the sensor reinforcement tab 245 and thus, to the actuator 230. This rotational force causes the actuator 230 to pivot or rotate in a counterclockwise direction (as viewed in FIGS. 5 and 6) about the primary axis 52 of the retractor 10. The actuator 230 moves from the first position shown in FIG. 5 to a second position as shown in FIG. 6. In a preferred embodiment of the invention, the actuator rotates approximately 16° about the primary axis 52 between the first position and the second position.

As the actuator 230 rotates, the lower link arm support post 248 on the actuator moves in an arcuate path centered on the primary axis 52. This arcuate movement of the support post 248 causes the hub 326 on the lower link arm 312 to move in the same arcuate path. Because the link assembly spring 316 is holding the engagement surface 344 of the upper link arm 314 against the engagement surface 324 of the lower link arm 312, the force of the moving lower link arm is transmitted to the upper link arm. Because of the pivot connections at the hubs 326 and 346 of the lower and upper link arms 312 and 314, respectively, and because the initiator 300 is itself supported for pivotal movement in the openings 90 and 158 in the sensor plate 80 and the spring plate 150, respectively, the hub of the upper link arm moves in a direction so as to pivot the initiator from the unactuated position shown in FIG. 5 to the actuated condition shown in FIG. 6.

The engagement surface 308 on the initiator 300 moves generally upward as viewed in FIGS. 5 and 6. The upward movement of the engagement surface 308 results in upward movement of the first clamp member 278 and, thereby, of the second clamp member 280. The sliding surface 284 on the first clamp member 278 slides along the first sliding surface 274 on the clamp housing 272. The sliding surface 288 on the second clamp member 280 slides along the second sliding surface 276 on the clamp housing 272. The clamp members 278 and 280 move upward and also move toward each other, partially closing the belt webbing passage 294. The clamping surface 286 on the first clamp member 278 and the clamping surface 290 on the second clamp member 280 engage opposite sides of the belt webbing 16. The teeth of the clamp members 278 and 280, respectively, dig into the material of the belt webbing 16. The webbing clamp assembly 270 is in the engaged condition shown in FIG. 6.

Movement of the belt webbing 16 upward as viewed in FIG. 6, that is, out of the retractor 10, pulls the clamp members 278 and 280 closer toward each other and tightens the belt webbing clamp assembly 270. This places the webbing clamp assembly 270 in a clamping condition and blocks withdrawal of the belt webbing 16 from the spool 170 and the retractor 10, restraining forward movement of the vehicle occupant.

Upon the cessation of vehicle deceleration above the predetermined deceleration and the release of the tensile forces on the belt webbing 16, the vehicle deceleration sensing assembly 250 returns to the position shown in FIG. 5. The actuator return spring (not shown) moves the actuator 230 back to the first position shown in FIG. 5. The initiator 300 and the link arms 312 and 314 move back to the unactuated condition shown in FIG. 5. Upon the release of tensile forces on the belt webbing 16, the clamp members 278 and 280 move back to the released condition shown in FIG. 5. The belt webbing 16 is freely movable through the passage 294 in the belt webbing clamp assembly 270.

In some circumstances, such as when an extraordinary tensile force is placed on the belt webbing 16, it is possible that the belt webbing may slip through the passage 294 between the clamp members 278 and 280. In other circumstances, the clamp mechanism 270 may be physically blocked from moving into the engaged condition shown in FIG. 6. In either of these cases, the clamp assembly 270 does not block withdrawal of belt webbing 16 from the spool 170. The tensile force on the belt webbing 16 causes the spool 170 to continue to rotate in the belt withdrawal direction 192. The pilot ratchet 220 and thus the actuator 230 continue to rotate in the belt withdrawal direction 192.

The actuator 230 is, as a result, driven to rotate about 4° farther, past the second position shown in FIG. 6 and into a third position (not shown) to actuate a secondary belt locking mechanism of the retractor 10 in a manner as follows. The surfaces defining the cam slot 244 on the actuator 230 lift the cam tab 210 of the lock pawl 200 so that the locking arms 202 and 204 of the lock pawl engage the ratchet teeth 180 on the spool 170. Because the spool 170 is supported by the movable hubs 102 and 162 of the sensor plate 80 and the spring plate 150, respectively, the force exerted by the belt webbing 16 on the spool does not then result in the lock pawl 200 blocking rotation of the spool. Instead, the spool 170, the hubs 102 and 162, and the actuator 230 shift or move radially relative to the frame 40. The ratchet teeth 180 on the spool 170 engage the fixed teeth 60 and 70 on the side walls 46 and 44, respectively, of the frame 40. The spool 170 is thereby blocked from rotation in the belt withdrawal direction 192. Thus, belt webbing 16 can not be withdrawn from the retractor 10, even though the belt webbing clamp assembly 270 is not in a clamping condition blocking the withdrawal of the belt webbing from the retractor. As a result, the vehicle occupant is restrained.

After the termination of the vehicle emergency, such as the sudden vehicle deceleration, the resilience of the support arms 104 on the sensor plate 80 and the support arms 162 on the spring plate 150 causes the hubs 102 and 162, the spool 170, and the actuator 230 to return to their original position centered on the primary axis 52 of the retractor 10. The actuator 230 rotates back to the first position shown in FIG. 5. The parts of the link assembly 310 return to the position shown in FIG. 5.

FIG. 7 illustrates the position of parts of the cinch mechanism 400 when the belt webbing 16 is fully retracted on the spool 170. The end portion 476 of the cam lobe 470 on the actuator gear 450 is disposed radially inward of the cam follower portion 414 of the cinch pawl 410. The cam lobe 470 on the actuator gear 450 holds the cinch tooth 418 on the cinch pawl 410 in a non-cinching position spaced radially outward from the pilot ratchet teeth 224 on the pilot ratchet 220. The cinch spring 420 is in the first condition biasing the cinch pawl 410 into the non-cinching position. Thus, the cinch mechanism 400 is in a non-cinching mode and does not block the spool 170 from rotation in the belt withdrawal direction 192.

When the vehicle occupant withdraws belt webbing 16 from the retractor 10, the spool 170 rotates about the primary axis 52 in the belt withdrawal direction 192, that is, counterclockwise as viewed in FIG. 7. The pilot ratchet 220, which is fixed for rotation with the spool 170, also rotates in the belt withdrawal direction 192, that is, counterclockwise as viewed in FIG. 7.

The pinion gear 226 on the pilot ratchet 220 also rotates in the belt withdrawal direction 192. The driver gear 446 on the intermediate gear 442, which is in meshing engagement with the pinion gear 226 on the pilot ratchet 220, rotates in the opposite direction, that is, clockwise as viewed in FIGS. 7 and 8. The follower gear 448, which is fixed for rotation with the driver gear 446, also rotates in a clockwise direction as viewed in FIGS. 7 and 8.

The rotating follower gear 448 is in meshing engagement with the arcuate internal gear segment 460 on the actuator gear 450. The actuator gear 450 therefore rotates about the primary axis 52 in the same direction as the follower gear 448, that is, in a clockwise direction as viewed in FIGS. 7 and 8.

As the actuator gear 450 rotates, the cam lobe 470 on the actuator gear 450 moves circumferentially relative to the cam follower portion 414 of the cinch pawl 410. During continued withdrawal of belt webbing 16 from the spool 170, the actuator gear 450 rotates about 180° to 200° around the primary axis 52 until the pawl engagement tab 480 of the actuator gear 450 engages the cam follower portion 414 of the cinch pawl 410 as shown in FIG. 8. The actuator gear 450 reaches that position when a first predetermined amount of the belt webbing 16 has been withdrawn from the retractor 10, typically the full amount of belt webbing on the spool 170.

The pawl engagement tab 480 of the actuator gear 450 engages the cam follower portion 414 of the cinch pawl 410 and causes the cinch pawl to pivot from the non-cinching position shown in FIG. 7 to the cinching position shown in FIG. 8. The cinch tooth 418 moves into the path of revolution of the pilot ratchet teeth 224 on the pilot ratchet 220. The cinch spring 420 moves into the second condition biasing the cinch pawl 410 into its cinching position. The cinch mechanism 400 of the retractor 10 is in a cinching mode.

If the vehicle occupant allows a limited amount of belt webbing 16 to be rewound onto the spool 170 under the influence of the rewind spring assembly 194, then the retractor spool 170 and the pinion gear 226 on the pilot ratchet 220 rotate in the belt retraction direction 190. The reduction gear assembly 440 causes the actuator gear 450 to rotate in the opposite counter-clockwise direction as viewed in FIGS. 8 and 9. The pawl engagement tab 480 on the actuator gear 450 moves away from the cam follower portion 414 of the cinch pawl 410. The pilot ratchet teeth 224 on the rotating pilot ratchet 220 sequentially engage the cinch tooth 418 on the cinch pawl 410. As each pilot ratchet tooth 224 passes under the cinch tooth 418 the cinch tooth is moved radially outward and then returns radially inward into the cinching position under the influence of the cinch spring 420. When the limited amount of belt retraction ceases, the cinch pawl 410 is still in the cinching position as viewed in FIGS. 8 and 9.

Should the occupant of the vehicle seat 14 move forward relative to the seat, the occupant engages the belt webbing 16. Also, should a child seat which is secured in the vehicle seat 14 by the seat belt system 12 experience forces acting to move the child seat forward relative to the vehicle seat, the child seat places an outwardly directed tensile force on the belt webbing 16. Either occurrence results in withdrawal of a small amount of belt webbing from the retractor 10. The retractor spool 170 rotates in the belt withdrawal direction 192.

The pilot ratchet 220 is fixed for rotation with the spool 170 and also rotates in the belt withdrawal direction 192. The cinch tooth 418 on the cinch pawl 410, which is disposed in the path of revolution of the ratchet teeth 224 of the pilot ratchet 20, is engaged by one of the moving pilot ratchet teeth. The cinch pawl 410 transmits the rotational force of the pilot ratchet 220 through the cinch pawl support post 239 into the actuator 230. The actuator 230 rotates about the primary axis 52.

The rotation of the actuator 230 results in movement of the belt webbing clamp assembly 270 to the engaged position shown in FIG. 6. Attempted further withdrawal of belt webbing 16 from the retractor 10 causes the belt webbing clamp assembly 270 to clamp the belt webbing more tightly and places the belt webbing clamp assembly in a clamping condition. This blocks further withdrawal of belt webbing 16 from the retractor 10 to restrain the vehicle occupant. Because the parts of the cinch mechanism 400 are mounted on the actuator 230 for rotation with the actuator, the cinch mechanism does not disengage during engagement of the primary belt locking mechanism 270 of the retractor 10.

When the cinch mechanism 400 is in the cinching mode, if the belt webbing clamp assembly 270 does not block withdrawal of belt webbing 16 from the retractor 10, the spool 170 continues to rotate in the belt withdrawal direction 192. The actuator 230 rotates to the third position (not shown) to actuate the secondary belt locking mechanism of the retractor 10 as described above. Because the parts of the cinch mechanism 400 are mounted on the actuator 230 for rotational movement with the actuator and for radial movement with the spool 170, the cinch mechanism does not disengage during engagement of the secondary belt locking mechanism of the retractor 10.

To take the retractor 10 out of the cinching mode, the vehicle occupant disengages the tongue assembly 22 (FIG. 1) from the buckle 26. The seat belt webbing 16 is wound onto the spool 170 of the retractor 10 under the influence of the rewind spring assembly 194. The retractor spool 170 rotates in the belt retraction direction 190. The reduction gear assembly 440 causes the actuator gear 450 to rotate in the counter-clockwise direction as viewed in FIGS. 7-9. The ramp portion 474 of the cam lobe 470 on the actuator gear 450 engages the cam follower portion 414 of the cinch pawl 410. The cam lobe 470 cams the cinch pawl 410 outwardly to the non-cinching position as viewed in FIG. 7. The retractor 10 is thus taken out of the cinching mode.

From the above description of the invention, those skilled in the art will perceive improvements, changes and modifications in the invention. For example, the retractor 10 may include a webbing acceleration sensitive mechanism for effecting rotation of the actuator 230 in the event of rotation of the spool 170 in the belt withdrawal direction 192 at a rate exceeding a predetermined rate of rotation. Such improvements, changes and modifications within the skill of the art are intended to be covered by the appended claims.

Having described the invention, we claim:

1. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

an actuator supported for movement on said retractor;

sensing means for sensing a vehicle emergency situation;

said actuator being movable with said spool from a first position to a second position in response to said sensing means sensing a vehicle emergency situation;

a primary belt locking mechanism which is actuatable in response to movement of said actuator from the first position to the second position to block withdrawal of belt webbing from said retractor; and a locking mechanism for actuating said primary belt locking mechanism to block withdrawal of belt webbing from said retractor in response to withdrawal of a predetermined amount of seat belt webbing from said spool, said locking mechanism including a drive mechanism which is driven by rotation of said spool and a member actuated by said drive mechanism when said predetermined amount of seat belt webbing is withdrawn from said spool;

said locking mechanism, including said drive mechanism and said member, being supported on said actuator for movement with said actuator.

2. A seat belt retractor as set forth in claim 1 wherein said actuator is supported for rotation about said axis, said locking mechanism comprising means for coupling said actuator for rotation with said spool in response to a predetermined amount of rotation of said spool in the belt withdrawal direction.

3. A seat belt retractor as set forth in claim 1 comprising a ratchet which is fixed for movement with said spool, said member being a pawl which is supported on said actuator for pivotal movement relative to said actuator and for movement with said actuator, said pawl having a tooth which is engageable with said ratchet in response to withdrawal of a predetermined amount of seat belt webbing from said spool to couple said actuator for movement with said ratchet and said spool.

4. A seat belt retractor as set forth in claim 3 wherein said actuator is supported for rotation about said axis, said pawl being supported on said actuator for rotation with said actuator.

5. A seat belt retractor as set forth in claim 1 wherein said actuator is supported for limited rotational movement about an axis of said retractor, said retractor including a linkage interconnecting said actuator and said primary belt locking mechanism for transmitting force from said actuator to said primary belt locking mechanism to actuate said primary belt locking mechanism in response to a predetermined first limited amount of rotation of said actuator about said spool axis.

6. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

a ratchet which is rotatable with said spool about said axis;

an actuator supported for rotation about said axis relative to said spool and said ratchet;

sensing means for sensing a vehicle emergency situation;

said actuator being rotatable with said spool from a first position to a second position in response to said sensing means sensing a vehicle emergency situation;

a primary belt locking mechanism which is actuatable in response to rotation of said actuator from the first position to the second position to block withdrawal of belt webbing from said retractor; and a locking mechanism including a drive mechanism which is driven by rotation of said spool and a pawl which is supported on said actuator for pivotal movement relative to said actuator and which is supported on said actuator for rotation with said actuator about said axis, said pawl having a tooth which is engageable with said ratchet in response to withdrawal of a predetermined amount of seat belt webbing from said spool to couple said actuator for rotation with said ratchet and said spool, said locking mechanism, including said drive mechanism and said pawl, being supported on said actuator for movement with said actuator.

7. A seat belt retractor as set forth in claim 6 wherein said actuator is supported for limited rotational movement about an axis of said retractor, said retractor including a linkage interconnecting said actuator and said primary belt locking mechanism for transmitting force from said actuator to said primary belt locking mechanism to actuate said primary belt locking mechanism in response to a predetermined first limited amount of rotation of said actuator about said spool axis.

8. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

an actuator supported for movement on said retractor;

sensing means for sensing a vehicle emergency situation;

said actuator being movable with said spool from a first position to a second position in response to said sensing means sensing a vehicle emergency situation;

a primary belt locking mechanism which is actuatable in response to movement of said actuator from the first position to the second position to block withdrawal of belt webbing from said retractor; and a locking mechanism for actuating said primary belt locking mechanism to block withdrawal of belt webbing from said retractor in response to withdrawal of a predetermined amount of seat belt webbing from said spool;

said locking mechanism being supported on said actuator for movement with said actuator;

said actuator being supported for rotation about said axis, said locking mechanism comprising means for coupling said actuator for rotation with said spool in response to a predetermined amount of rotation of said spool in the belt withdrawal direction, said means for coupling comprising a gear train driven by rotation of said spool, said gear train including a first gear fixed for rotation with said spool and a second gear which is in meshing engagement with said first gear, said second gear being supported by said actuator for rotation with said actuator about said axis.

9. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

an actuator supported for movement on said retractor;

sensing means for sensing a vehicle emergency situation;

said actuator being movable with said spool from a first position to a second position in response to said sensing means sensing a vehicle emergency situation;

a primary belt locking mechanism which is actuatable in response to movement of said actuator from the first position to the second position to block withdrawal of belt webbing from said retractor; and a locking mechanism for actuating said primary belt locking mechanism to block withdrawal of belt webbing from said retractor in response to withdrawal of a predetermined amount of seat belt webbing from said spool;

said locking mechanism being supported on said actuator for movement with said actuator;

said actuator being supported for rotation about said axis, said locking mechanism comprising means for coupling said actuator for rotation with said spool in response to a predetermined amount of rotation of said spool in the belt withdrawal direction, said means for coupling comprising a gear train driven by rotation of said spool, said gear train including a plurality of gears which are supported by said actuator for rotation with said actuator about said axis.

10. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

an actuator supported for movement on said retractor;

sensing means for sensing a vehicle emergency situation;

said actuator being movable with said spool from a first position to a second position in response to said sensing means sensing a vehicle emergency situation;

a primary belt locking mechanism which is actuatable in response to movement of said actuator from the first position to the second position to block withdrawal of belt webbing from said retractor;

a locking mechanism for actuating said primary belt locking mechanism to block withdrawal of belt webbing from said retractor in response to withdrawal of a predetermined amount of seat belt webbing from said spool, said locking mechanism being supported on said actuator for movement with said actuator;

a ratchet which is fixed for movement with said spool, said locking mechanism including a pawl which is supported on said actuator for pivotal movement relative to said actuator and for movement with said actuator, said pawl having a tooth which is engageable with said ratchet in response to withdrawal of a predetermined amount of seat belt webbing from said spool to couple said actuator for movement with said ratchet and said spool; and an overcenter spring having a first end portion which is supported on said actuator and a second end portion which is supported on said pawl, said overcenter spring having a first condition biasing said tooth on said pawl out of engagement with said ratchet and having a second condition biasing said tooth on said pawl into engagement with said ratchet.

11. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

an actuator supported for movement on said retractor;

sensing means for sensing a vehicle emergency situation;

said actuator being movable with said spool from a first position to a second position in response to said sensing means sensing a vehicle emergency situation;

a primary belt locking mechanism which is actuatable in response to movement of said actuator from the first position to the second position to block withdrawal of belt webbing from said retractor;

a locking mechanism for actuating said primary belt locking mechanism to block withdrawal of belt webbing from said retractor in response to withdrawal of a predetermined amount of seat belt webbing from said spool;

said locking mechanism being supported on said actuator for movement with said actuator;

said actuator being supported for limited rotational movement about an axis of said retractor, said retractor including a linkage interconnecting said actuator and said primary belt locking mechanism for transmitting force from said actuator to said primary belt locking mechanism to actuate said primary belt locking mechanism in response to a predetermined first limited amount of rotation of said actuator about said spool axis; and a secondary belt locking mechanism which is actuatable in the event of inability of said primary belt locking mechanism to block withdrawal of belt webbing from said retractor, said secondary belt locking mechanism being actuatable in response to a predetermined second limited amount of rotation of said actuator about said axis, said locking mechanism being movable with said actuator upon rotation of said actuator to actuate said secondary belt locking mechanism.

12. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

a ratchet which is rotatable with said spool about said axis;

an actuator supported for rotation about said axis relative to said spool and said ratchet;

sensing means for sensing a vehicle emergency situation;

said actuator being rotatable with said spool from a first position to a second position in response to said sensing means sensing a vehicle emergency situation;

a primary belt locking mechanism which is actuatable in response to rotation of said actuator from the first position to the second position to block withdrawal of belt webbing from said retractor;

a pawl which is supported on said actuator for pivotal movement relative to said actuator and which is supported on said actuator for rotation with said actuator about said axis, said pawl having a tooth which is engageable with said ratchet in response to withdrawal of a predetermined amount of seat belt webbing from said spool to couple said actuator for rotation with said ratchet and said spool; and an overcenter spring having a first end portion which is supported on said actuator and a second end portion which is supported on said pawl, said overcenter spring having a first condition biasing said tooth on said pawl out of engagement with said ratchet and having a second condition biasing said tooth on said pawl into engagement with said ratchet.

13. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

a ratchet which is rotatable with said spool about said axis;

an actuator supported for rotation about said axis relative to said spool and said ratchet;

sensing means for sensing a vehicle emergency situation;

said actuator being rotatable with said spool from a first position to a second position in response to said sensing means sensing a vehicle emergency situation;

a primary belt locking mechanism which is actuatable in response to rotation of said actuator from the first position to the second position to block withdrawal of belt webbing from said retractor;

a pawl which is supported on said actuator for pivotal movement relative to said actuator and which is supported on said actuator for rotation with said actuator about said axis, said pawl having a tooth which is engageable with said ratchet in response to withdrawal of a predetermined amount of seat belt webbing from said spool to couple said actuator for rotation with said ratchet and said spool; and a gear train driven by rotation of said spool, said gear train including a first gear fixed for rotation with said spool and a second gear which is in meshing engagement with said first gear, said second gear being supported by said actuator for rotation with said actuator about said axis.

14. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

a ratchet which is rotatable with said spool about said axis;

an actuator supported for rotation about said axis relative to said spool and said ratchet;

sensing means for sensing a vehicle emergency situation;

said actuator being rotatable with said spool from a first position to a second position in response to said sensing means sensing a vehicle emergency situation;

a primary belt locking mechanism which is actuatable in response to rotation of said actuator from the first position to the second position to block withdrawal of belt webbing from said retractor;

a pawl which is supported on said actuator for pivotal movement relative to said actuator and which is supported on said actuator for rotation with said actuator about said axis, said pawl having a tooth which is engageable with said ratchet in response to withdrawal of a predetermined amount of seat belt webbing from said spool to couple said actuator for rotation with said ratchet and said spool; and a gear train driven by rotation of said spool, said gear train including a plurality of gears which are supported by said actuator for rotation with said actuator about said axis.

15. A seat belt retractor comprising:

a length of seat belt webbing which is extensible about a vehicle occupant to restrain the vehicle occupant;

a spool on which said belt webbing is wound, said spool being rotatable about an axis in a belt retraction direction and in an opposite belt withdrawal direction;

a ratchet which is rotatable with said spool about said axis;

an actuator supported for rotation about said axis relative to said spool and said ratchet;

sensing means for sensing a vehicle emergency situation;

said actuator being rotatable with said spool from a first position to a second position in response to said sensing means sensing a vehicle emergency situation;

a primary belt locking mechanism which is actuatable in response to rotation of said actuator from the first position to the second position to block withdrawal of belt webbing from said retractor;

a pawl which is supported on said actuator for pivotal movement relative to said actuator and which is supported on said actuator for rotation with said actuator about said axis, said pawl having a tooth which is engageable with said ratchet in response to withdrawal of a predetermined amount of seat belt webbing from said spool to couple said actuator for rotation with said ratchet and said spool; and a secondary belt locking mechanism which is actuatable in the event of inability of said primary belt locking mechanism to block withdrawal of belt webbing from said retractor, said secondary belt locking mechanism being actuatable in response to a predetermined second limited amount of rotation of said actuator about said axis, said locking mechanism being rotatable with said actuator upon rotation of said actuator to actuate said secondary belt locking mechanism.

* * * * *